(12) United States Patent
Kim et al.

(10) Patent No.: US 9,233,495 B2
(45) Date of Patent: Jan. 12, 2016

(54) SHEET FOR FORMING HARD COATING

(75) Inventors: Yun-Bong Kim, Daejeon (KR);
Won-Kook Kim, Daejeon (KR);
Dong-Joo Gwon, Daejeon (KR);
Yang-Gu Kang, Daejeon (KR);
Jin-Woo Kim, Daejeon (KR); Mu-Seon Ryu, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 393 days.

(21) Appl. No.: 13/496,074

(22) PCT Filed: Feb. 9, 2011

(86) PCT No.: PCT/KR2011/000877
§ 371 (c)(1),
(2), (4) Date: Mar. 14, 2012

(87) PCT Pub. No.: WO2011/099777
PCT Pub. Date: Aug. 18, 2011

(65) Prior Publication Data
US 2012/0168074 A1    Jul. 5, 2012

(30) Foreign Application Priority Data
Feb. 10, 2010   (KR) .................. 10-2010-0012428

(51) Int. Cl.
*B32B 9/04* (2006.01)
*B32B 27/38* (2006.01)
*B29C 65/54* (2006.01)
(Continued)

(52) U.S. Cl.
CPC ........... *B29C 45/14811* (2013.01); *C08J 7/047* (2013.01); *C09D 133/06* (2013.01); *C09J 7/0296* (2013.01); *B29K 2995/0058* (2013.01); *B29K 2995/0087* (2013.01); *C08J 2300/24* (2013.01); *C09J 2201/122* (2013.01); *C09J 2463/006* (2013.01)

(58) Field of Classification Search
None
See application file for complete search history.

(56) References Cited

U.S. PATENT DOCUMENTS 5,880,171 A * 3/1999 Lim et al. ...................... 523/106
5,989,778 A * 11/1999 Hozumi .................... 430/281.1
(Continued)

FOREIGN PATENT DOCUMENTS

| CN | 1328508 A | 12/2001 |
|---|---|---|
| JP | 2001054999 A | 2/2001 |

(Continued)

OTHER PUBLICATIONS

About.com: Composites/Plastics—Curing Agents: definition. Retrieved on Jun. 21, 2014.*
(Continued)

*Primary Examiner* — Coris Fung
(74) *Attorney, Agent, or Firm* — Nath Goldberg & Meyer; Jerald L. Meyer; Stanley N. Protigal

(57) ABSTRACT

The present invention relates to a sheet for forming a hard coating and a method of formation. The present invention can provide a transfer material or a surface protection sheet having a high index of refraction and superior physical properties, such as hardness, friction resistance, abrasion resistance, chemical resistance, transparency, luster, and the like, for forming a hard coating on the surface of various molded products, including resin molded products or wood products, and a method for forming a hard coating from such transfer material or surface protection sheets.

13 Claims, 4 Drawing Sheets

(51) Int. Cl.
*B29C 45/14* (2006.01)
*C08J 7/04* (2006.01)
*C09J 7/02* (2006.01)
*C09D 133/06* (2006.01)

(56) References Cited

U.S. PATENT DOCUMENTS

| | | | |
|---|---|---|---|
| 6,153,719 | A | 11/2000 | Abbey et al. |
| 6,232,426 | B1 | 5/2001 | Orikabe et al. |
| 6,433,097 | B1 | 8/2002 | Nixon et al. |
| 7,399,530 | B2 | 7/2008 | Hayashida et al. |
| 2007/0066702 | A1* | 3/2007 | Okazaki et al. ........... 522/160 |
| 2007/0096056 | A1* | 5/2007 | Takeuchi et al. ......... 252/299.01 |
| 2007/0237996 | A1 | 10/2007 | Kindervater et al. |
| 2009/0047531 | A1 | 2/2009 | Bartley et al. |
| 2009/0214871 | A1* | 8/2009 | Fukuda et al. ............. 428/413 |
| 2009/0291248 | A1 | 11/2009 | Hongo et al. |
| 2011/0144279 | A1* | 6/2011 | Uchida et al. ............. 525/301 |

FOREIGN PATENT DOCUMENTS

| | | | |
|---|---|---|---|
| JP | 2013512305 A | | 4/2013 |
| JP | 2013518713 A | | 5/2013 |
| TW | 200927852 A | | 7/2009 |
| WO | 2004039856 A1 | | 5/2004 |
| WO | 2005052021 A1 | | 6/2005 |
| WO | WO2010016585 | * | 2/2010 |

OTHER PUBLICATIONS

ChemBlink—pentaerythritol tetra(mercaptopropionate). Retrieved on Jun. 21, 2014.*

Sigma-Aldrich: trimethylolpropane tris(3-mercaptopropionate. Retrieved on Jun. 20, 2014.*

Mano et al., WO 2004/039586 machine translation. May 13, 2004.*

* cited by examiner

SHEET FOR FORMING HARD COATING

This is a National Phase Application filed under 35 U.S.C. 371 as a national stage of PCT/KR2011/000877, filed Feb. 9, 2011, and claims priority benefit from Korean Application No.10-2010-0012428, filed Feb. 10, 2010, the content of each of which is hereby incorporated by reference in its entirety.

TECHNICAL FIELD

The present invention relates to a sheet for forming a hard coating and a method of forming the same.

BACKGROUND ART

Various methods are used to form a hard coating (also referred to as a protective layer) having excellent abrasion resistance and chemical resistance on various molded products, such as resin products or wooden products. For example, a sheet on which a coating layer is formed of a photo-curable resin composition on a release layer of a base having release properties (such sheets are referred to as a "transfer material") may be used. In this case, the coating layer is attached to the surface of a molded product, and the base is separated, thereby forming a hard coating. Another method of forming a hard coating uses a sheet in which a coating layer is formed on one side of a base having no release properties and an adhesive layer is formed on the opposite side of the base as needed (such a sheet is referred to as a "surface protective sheet"). In this method, the base of the surface protective sheet is attached to the surface of a molded product to form a hard coating.

The transfer material or surface protective sheet may include a decorative layer, such as a patterned layer or deposition layer, in a proper position as necessary. The transfer material mostly includes a patterned layer or deposition layer formed between the base and the coating layer, and the surface protective sheet generally includes a patterned layer or deposition layer formed on an opposite side of the base to the coating layer.

When forming a hard coating using a transfer material or a surface protective sheet, a pre-curing process is carried out, in which light is irradiated prior to application of the transfer material or surface protective sheet to a molded product to photo-cure a coating layer. However, in this case, a cured hard coating can be separated from a curved potion or cracks can occur on the hard coating upon application of the transfer material or surface protective sheet to the molded product.

Thus, in application to a molded product, an un-cured coating layer is bonded to the surface of the molded product and then cured, which is referred to as a post-curing (or after-curing) method. However, the post-curing process has the following problems.

A transfer material or surface protective sheet is generally prepared using a machine, such as a gravure rotary printing machine. However, when the post-curing process is used to form, for example, a patterned layer, a deposition layer, or an adhesive layer on a coating layer in formation of a transfer material or to roll a sheet in formation of a surface protective sheet, components of an uncured coating layer may be transferred to a guide roll or components used for forming the patterned layer, or adhesive layer may be transferred to the coating layer. Further, components of the coating layer may be transferred back to the guide roll for forming the patterned layer or adhesive layer (a so-called back trapping phenomenon).

Accordingly, when the post-curing process is used, special equipment or an additional process including a drying process is involved in forming a coating layer in order to remove fluidity or tack of the coating layer before photo-curing. However, in this case, the coating layer, the patterned layer, or the adhesive layer may not be formed at the same time and substantial costs for designing separate equipment are needed, thereby reducing productivity of a transfer material or surface protective sheet and considerably increasing manufacturing costs.

DISCLOSURE

Technical Problem

The present invention provides a sheet for forming a hard coating and a method of forming the same.

Technical Solution

An aspect of the present invention provides a sheet for forming a hard coating, which includes a base; a coating layer formed on one side of the base and containing a resin composition including a resin and a thiol curing agent, the resin having an epoxy group and a (meth)acryloyl group; and an adhesive layer formed on the coating layer or on the other side of the base.

As used herein, the term "hard coating" refers to a high-hardness functional layer which imparts wear resistance, abrasion resistance, scratch resistance, and chemical resistance to surfaces of various molded products including resin, wooden, metal and other molded products and may refer to a functional layer employed for various display apparatuses in some cases. Herein, the term "hard coating" may be equivalent to the term "protective layer" in some cases.

Further, as used herein, the sheet for forming a hard coating means a sheet capable of forming a hard coating on a molded product through transfer, transfer concurrent with injection, insert molding, attachment, or the like. For example, the sheet may be realized by a transfer material, a surface protective sheet, and the like.

Hereinafter, the sheet according to the present invention will be described in more detail.

FIGS. 1 and 2 are sectional views of a sheet for forming a hard coating according to exemplary embodiments of the invention. As shown in FIGS. 1 and 2, a sheet 2 or 3 for forming a hard coating may include a base 11, a coating layer 12 formed on one side of the base 11, and an adhesive layer 21 or 31 formed on the coating layer 12 or on the other side of the base 11.

The base for the sheet according to the present invention is not particularly limited as to kind. Examples of the base may include resin films containing polypropylene resins, polyethylene resins, polyamide resins, polyester resins, polyacrylic resins, polyvinyl chloride resins, acrylic resins, polycarbonate resins, vinyl chloride resins, urethane resins or polyester resins as a main component; metal foils, such as aluminum foil or copper foil; cellulose sheets, such as glassine paper, coated paper, or cellophane; or a complex sheet of at least two thereof. Herein, the thickness of the base is not particularly limited and may be suitably adjusted according to desired physical properties.

According to the present invention, when the sheet for forming a hard coating constitutes a transfer material, a release layer may be formed on the base and the coating layer may be formed on the release layer. In this case, the release layer may be formed by any method, for example, various printing methods or coating methods using epoxy, epoxy-melamine, aminoalkyd, acrylic, melamine, silicone, fluorine, cellulose, urea resin, polyolefin, paraffin release agents, or a complex release agent of at least two thereof.

As needed, the base or the release layer may be formed in a photoless form. For example, embossing is performed on the base or the release layer, or fine powder of calcium carbonate, silica, zinc oxide, magnesium carbonate, polyethylene wax, or glass beads are introduced into the release layer to form a photoless surface. Accordingly, for the transfer material, fine uneven parts formed on the release layer are transferred to the surface of the coating layer after separating the base, thereby providing a molded product having a photoless surface. The photoless surface may be formed entirely or partly on the surface of the base or release layer. Herein, the thickness of the release layer or photoless layer is not particularly limited and may be suitably adjusted as needed.

As used herein, the expressions "B formed on A," "B formed on an upper side of A," or "B formed on the surface of A" mean that B can be attached or bonded directly to the surface of A, B can be attached or bonded to A by a pressure-sensitive adhesive or an adhesive, or an intervening layer can be formed between A and B (e.g., A-C-B).

In the sheet of the present invention, the coating layer contains a heat-cured product including a resin, which includes an epoxy group and a (meth)acryloyl group, and a thiol curing agent. In the sheet of the present invention, the coating layer may be a photocurable type layer, which includes a heat-cured product of the resin composition according to the invention as an effective element.

As used herein, the term "heat-cured product of a resin composition" refers to a reaction state between an epoxy group or carbon-carbon double bond of the resin and a thiol curing agent. Further, the term "photocurable type" means the state of the coating layer wherein curing reaction may occur by reaction of (meth)acryloyl groups included in the resin when electromagnetic waves are irradiated thereupon. In this case, electromagnetic waves may collectively refer not only to microwaves, infrared light (IR), ultraviolet light (UV), x-rays and gamma ($\gamma$) rays, but also to particle beams, such as a-particle beams, proton beams, neutron beams, and electron beams.

Herein, the resin composition forming the coating layer includes a resin containing an epoxy group and a (meth)acryloyl group. Herein, the term "(meth)acryloyl group," "(meth)acrylate," and "(meth)acrylic acid" collectively refer to both an acryloyl group and a (meth)acryloyl group, to both acrylate and (meth)acrylate, and to both acrylic acid and (meth)acrylic acid, respectively.

The resin included in the resin composition may have an epoxy equivalent weight of 200 to 20,000 g/eq, preferably 2,000 to 8,000 g/eq, and more preferably 4,000 to 8,000 g/eq. The term "epoxy equivalent weight (g/eq)" refers to a value obtained by dividing the molecular weight of an epoxy group by the number of epoxy groups included in the resin. Epoxy equivalent weight may be chemically analyzed by various titration methods known in the art. In the present invention, the epoxy equivalent weight of the resin is controlled within the above range, thereby providing a resin layer having excellent process efficiency such as heat curing efficiency, exhibiting suitably controlled tack or adhesion after heat curing, and having excellent physical properties including solvent resistance or chemical resistance.

In the resin composition, the resin may also have a (meth)acryloyl equivalent weight of about 100 to 1,000 g/eq, preferably about 200 to 500 g/eq. The term "(meth)acryloyl equivalent weight (g/eq)" refers to a value obtained by dividing the molecular weight of a (meth)acryloyl group by the number of (meth)acryloyl groups included in the resin. (Meth)acryloyl equivalent weight may be chemically analyzed by various titration methods known in the art. In the present invention, the (meth)acryloyl equivalent weight of the resin is controlled within the above range, thereby providing a hard coating layer having excellent process efficiency, such as photo-curing efficiency, and exhibiting excellent physical properties including wear resistance, abrasion resistance, and chemical resistance after curing.

The resin containing an epoxy group and a (meth)acryloyl group may have a weight average molecular weight of about 5,000 to 100,000, preferably about 10,000 to 80,000, and more preferably about 20,000 to 70,000. As used herein, the term "weight average molecular weight (Mw)" refers to a value obtained based on a polystyrene standard measured by gel permeation chromatography (GPC). In the present invention, the weight average molecular weight is controlled within the above range, thereby providing a hard coating layer having excellent process efficiency, such as coatability, heat curing efficiency, and photo-curing efficiency, exhibiting suitably controlled tack or adhesion after heat curing, and having excellent physical properties including wear resistance, abrasion resistance, and chemical resistance after photo-curing.

In the present invention, the resin may be prepared by any method. For example, a monomer mixture including an epoxy group containing monomer (e.g., glycidyl (meth)acrylate) is polymerized into an epoxy group containing polymer, which is subjected to additive reaction with a (meth)acryloyl group containing the compound, e.g., $\alpha,\beta$-unsaturated monocarbonic acid (e.g., (meth)acrylic acid), thereby preparing the above resin.

In one embodiment, the monomer mixture may include glycidyl(meth)acrylate alone, or include glycidyl(meth)acrylate and another comonomer as needed.

Any comonomer which includes an $\alpha,\beta$-unsaturated carbon-carbon double bond may be included in the monomer mixture. Examples of the comonomer may include, without being limited to, C1 to C14 alkyl group containing (meth)acrylates, styrene, vinyl acetate, or (meth)acrylonitrile. When the monomer mixture includes glycidyl(meth)acrylate and a comonomer, the amount of each monomer may not be particularly limited but be adjusted suitably in consideration of desired effects. For example, the monomer mixture may include 5 to 70 parts by weight of the glycidyl (meth)acrylate and 5 to 70 parts by weight of the comonomer.

The monomer mixture may be polymerized into a polymer by any polymerization method. For example, any polymerization used in the art, such as solution polymerization, photo-polymerization, bulk polymerization, suspension polymerization, or emulsion polymerization, may be used.

The polymer is then subjected to additive reaction with a (meth)acryloyl group containing compound, for example, $\alpha,\beta$-unsaturated monocarbonic acid (e.g., (meth)acrylic acid), thereby preparing the above resin. In this case, a method and conditions for the additive reaction of the polymer with the compound are not particularly limited and may be suitably selected from methods and conditions used in the art. Further, the amount of the (meth)acryloyl group containing compound involved in additive reaction with respect to the polymer is not particularly limited and may be suitably adjusted within the range in which an epoxy equivalent weight and a (meth)acryloyl equivalent weight are satisfactory. For example, the compound may be added such that the remaining amount of epoxy groups included in the polymer in additive reaction may be about 50% or less, preferably about 30% or less, and more preferably about 5% with respect to a reaction equivalent weight of α,β-unsaturated monocarbonic acid of 100% based on the amount of the epoxy group containing monomer involved in the reaction.

The resin composition of the present invention includes a thiol curing agent. As used herein, the term "thiol curing agent" refers to a compound having at least one thiol group which reacts with an epoxy group included in the resin or a carbon-carbon double bond of the compound included in the composition to primarily heat-cure the resin composition.

Any thiol curing agent may be used so long as the curing agent includes at least one thiol group, preferably at least two thiol groups.

Examples of the thiol curing agent may include at least one polythiol selected from the group consisting of ethoxylated trimethylolpropane tris(3-mercaptopropionate), trimethylolpropane tris(3-mercaptopropionate), glycol di(3-mercaptopropionate), pentaerythritol tetrakis (3-mercapto-propionate), 4-mercaptomethyl-3,6-dithia-1,8-octanedithiol, pentaerythritol tetrakis(3-mercaptoacetate), trimethylolpropane tris(3-mercapto acetate), 4-t-butyl-1,2-benzenedithiol, 2-mercaptoethylsulfide, 4,4'-thiodibenzenethiol, benzenedithiol, glycol dimercaptoacetate, glycol dimercaptopropionate ethylene bis(3-mercaptopropionate), polyethylene glycol dimercaptoacetates, and polyethylene glycol di(3-mercaptopropionates).

Specifically, the thiol curing agent may include a thiol curing agent represented by Formula 1:

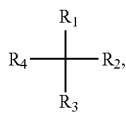

where $R_1$ to $R_4$ each independently represent hydrogen, alkyl, alkoxy, alkenyl, alkynyl, or a thiol containing group, and at least two of $R_1$ to $R_4$ represent a thiol containing group.

As used herein, the term "alkyl" or "alkoxy" may refer to a C1 to C20, C1 to C16, C1 to C12, C1 to C8, or C1 to C4 straight, branched, cyclic or noncyclic alkyl or alkoxy group, and the alkyl or alkoxy group may be randomly substituted by at least one substituent.

Further, the term "alkenyl" or "alkynyl" may refer to a C2 to C20, C2 to C16, C2 to C12, C2 to C8, or C2 to C4 straight, branched, cyclic or noncyclic alkenyl or alkynyl group, and the alkenyl or alkynyl group may be randomly substituted by at least one substituent.

Here, examples of the substituent to substitute for the alkyl, alkoxy, alkenyl, or alkynyl group may include any substituent used in the field of chemistry, for example, a thiol, amine, amide, halogen, hydroxyl, carboxyl, glycidyl, cyano, nitro, hetercycloalkyl, or aryl group, without being limited thereto.

In the compound represented by Formula 1, any thiol containing group may be used so long as a substituent structure thereof has a univalent moiety having a terminal thiol group (—SH). For example, the thiol containing group may be a univalent moiety represented by Formula 2:

-A-B—C-D-SH where A represents a single bond or alkylene, B is —NH(C=O)—, —OC(=O)—, —O-E-C(=O)—, —SC(=O)—, or —OCH$_2$—, C represents a single bond or alkylene, and D represents a single bond or a bivalent moiety represented by Formula 3, wherein E represents alkylene.

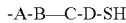 [Formula 3]

where P represents a bivalent aryl group, and n represents an integer from 0 to 10.

In A, C or D, the term "single bond" means that there is no atom at the A, C or D position. For example, when A is a single bond, the thiol containing group is represented by —B—C-D-SH. When C is a single bond, the thiol containing group is represented by -A-B-D-SH. When D is a single bond, the thiol containing group is represented by -A-B—C—SH.

Further, the term "alkylene" may represent C1 to C20, C1 to C16, C1 to C12, C1 to C8, or C1 to C4 straight, branched, cyclic, or noncyclic alkylene, and the alkylene may be randomly substituted by at least one substituent.

In addition, the term "bivalent aryl" refers to a bivalent moiety derived from an aromatic ring compound or including the compound in the structure. For example, bivalent aryl may refer to a bivalent moiety derived from a 6 to 22-membered, 6 to 18-membered, 6 to 14-membered, or 6 to 10-membered aromatic ring compound or including these compounds in the structure and be randomly substituted by at least one substituent.

In Formula 3, n may be an integer from 0 to 7, preferably 0 to 5, and more preferably 0 to 3.

Examples of the substituent to substitute alkylene or bivalent aryl are described above with reference to Formula 1.

In the thiol curing agent represented by Formula 1, $R_1$ to $R_4$ each independently may represent hydrogen, C1 to C4 alkyl or -A-B—C-D-SH, preferably hydrogen, methyl, ethyl or -A-B—C-D-SH.

Further, at least two, preferably at least three of $R_1$ to $R_4$ may be -A-B—C-D-SH, where A may represent a single bond or C1 to C4 alkylene, B may be —OC(=O) or —O-E-OC(=O)—, C may represent a single bond or C1 to C4 alkylene, and D may represent a single bond or a bivalent moiety represented by Formula 4, wherein E may represent a C1 to C4 alkylene:

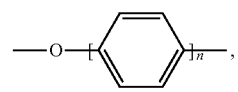 [Formula 4]

where n represents an integer from 0 to 10, preferably 0 to 7, more preferably 0 to 5, still more preferably 0 to 3, and still more preferably 1 to 3.

Examples of the thiol curing agent represented by the above formula may include, without being limited to, alkoxylated trimethylolpropane tris(3-mercaptopropionate), trimethylolpropane tris(3-mercaptopropionate), or alkylene glycol bis(3-mercaptopropionate), more specifically ethoxylated trimethylolpropane tris(3-mercaptopropionate), trimethylolpropane tris(3-mercaptopropionate), or ethylene glycol bis(3-mercaptopropionate).

In the resin composition, the amount of the thiol curing agent may be suitably adjusted in consideration of the equivalent weight of epoxy groups included in the resin or a desired curing rate, without being particularly limited. For example, the resin composition may include 0.1 to 10 parts by weight, preferably 0.5 to 5 parts by weight of the thiol curing agent based on 100 parts by weight of the resin. In the present invention, a ratio of the thiol curing agent to the resin is controlled within the above range, thereby inducing appropriate reaction with an epoxy group or a carbon-carbon double bond in heat curing, suitably controlling expression of tack after heat curing, and maintaining superior physical properties including solvent resistance or coatability.

The resin composition of the present invention may further include a photoinitiator. In the present invention, any photoinitiator known in the art may be used.

Examples of the photoinitiator may include benzoins, hydroxyl ketones, amino ketones, or phosphine oxides, specifically benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2(hydroxy-2-propyl)ketone, benzophenone, p-phenylbenzophenone, 4,4'-diethylamino benzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenonedimethyl ketal, p-dimethylamine benzoate, oligo(2-hydroxy-2-methyl-1-[4-(1-methylvinyl)phenyl]propanone), and 2,4,6-trimethylbenzoyl-diphenylphosphine oxide, which may be used alone or in combination thereof, without being limited thereto.

The photoinitiator may be present in an amount of 1 to 15 parts by weight, preferably 3 to 12 parts by weight, and more preferably 5 to 10 parts by weight, based on 100 parts by weight of the resin. Within this range, the composition can maintain excellent photo-curing efficiency and be prevented from deteriorating in physical properties due to remaining components after curing.

The resin composition may further include multifunctional acrylate. When the resin composition includes a multifunctional acrylate, the hard coating can have a dense cross-linking structure after photo-curing and thus have improved physical properties in terms of hardness, wear resistance, abrasion resistance, and chemical resistance.

Examples of the multifunctional acrylate may include, without being limited to, bifunctional acrylates, such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxyl pivalic acid neopentyl glycol di(meth)acrylate, dicyclopentanyl di(meth)acrylate, caprolactone modified dicyclopentenyl di(meth)acrylate, ethyleneoxide modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide modified hexahydrophthalic acid di(meth)acrylate, tricyclodecane dimethanol(meth)acrylate, neopentyl glycol modified trimethylpropane di(meth)acrylate, adamantane di(meth)acrylate or 9,9-bis[4-(2-acryloyloxyethoxy)phenyl]fluorene); trifunctional acrylates, such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide modified trimethylolpropane tri(meth)acrylate, trifunctional urethane(meth)acrylate or tris(meth)acryloxyethylisocyanurate; tetrafunctional acrylates, such as diglycerin tetra(meth)acrylate or pentaerythritol tetra(meth)acrylate; pentafunctional acrylates, such as propionic acid modified dipentaerythritol penta(meth)acrylate; and hexafunctional acrylates, such as dipentaerythritol hexa(meth)acrylate, caprolactone modified dipentaerythritol hexa(meth)acrylate or urethane (meth)acrylate (e.g, reaction products of an isocyanate monomer and trimethylolpropane tri(meth)acrylate).

Specifically, an acrylate including a ring structure and/or a urethane bond in the molecular structure thereof may be used as the multifunctional acrylate. Due to use of such acrylate, the hard coating layer may have excellent hardness after curing and a high refractive index. In this case, the ring structure included in the acrylate may be a carbocyclic, heterocyclic, monocyclic or polycyclic structure. In detail, examples of the ring structure included in the multifunctional acrylate may include C3 to C12, preferably C3 to C8 cycloalkyl ring structures, such as cyclopentane, cyclohexane, or cycloheptane, and the acrylate may include at least one, preferably 1 to 5, and more preferably 1 to 3 such ring structures and may include at least one hetero atom such as O, S or N.

Examples of the multifunctional acrylate containing a ring structure may include, without being limited to, a monomer having an isocyanurate structure, such as tris(meth)acryloxyethylisocyanurate, and isocyanurate modified urethane acrylate (e.g., reaction products of isocyanate compounds having a ring structure, such as isoboron diisocyanate, and acrylate compounds, such as trimethylolpropane tri(meth)acrylate or pentaerythritol tri(meth)acrylate).

The multifunctional acrylate may be present in an amount of 30 parts by weight or less, preferably 5 to 15 parts by weight based on 100 parts by weight of the resin. Within this range, the hard coating layer can have superior physical properties, such as hardness.

The resin composition may further include an antioxidant, and thus yellowing of the coating layer may be prevented.

Any antioxidant known in the art may be used, without being limited thereto. For example, phenolic antioxidants, (e.g., IRGANOX, RONOTEC and ETANOX), phosphorus antioxidants (e.g., CYANOX and ULTRANOX), or chelated antioxidants (e.g., IGAFOS) may be used.

The amount of the antioxidant is not particularly limited and may be suitably adjusted in terms of physical properties of the coating layer. For example, the resin composition may include 0.1 to 2 parts by weight of the antioxidant based on 100 parts by weight of the resin.

The resin composition may further include a lubricant. The lubricant may improve winding efficiency of the coating layer formed of the resin composition, blocking resistance, wear resistance, and scratch resistance. Any lubricant may be used, for example, waxes, such as polyethylene wax, paraffin wax, synthetic wax, and montan wax; and synthetic resins, such as silicon resins or fluoric resins. The lubricant may be present in an amount of 0.5 to 15 parts by weight, preferably 1 to 6 parts by weight based on 100 parts by weight of the resin, without being limited thereto. Within this range, the coating layer can have excellent blocking resistance, abrasion resistance, and scratch resistance while maintaining superior transparency.

The resin composition may include a suitable amount of a UV absorber to improve light resistance. Examples of the UV absorber may include hydroxyphenyl benzotriazole, hydroxyphenyl-S-triazine, or 2-(2'-hydroxy-5'-methacryloxyethylphenyl)-2H-benzotriazole, without being limited thereto. When the UV absorber is included, the amount of the UV absorber is not particularly limited and may be suitably adjusted in view of desired physical properties.

In addition to the above components, the resin composition may further include additives known in the art, for example, thermosetting catalysts, such as dimethylaminopyridine (DMAP), fillers, such as nano-silica, isocyanate compounds, etc., without departing from the spirit and scope of the invention.

According to this invention, any method may be used to form the coating layer on the base using the resin composition as described above. For example, the coating layer may be formed by treating the resin composition under suitable conditions to form a reaction product via reaction of an epoxy group or carbon-carbon double bond of the resin of the composition and a thiol group of the thiol curing agent and applying the composition including the product to the base in a suitable manner. In this case, the reaction conditions for forming the reaction product are not particularly limited and may be suitably set in consideration of the amount or kind of epoxy group of the resin or the thiol group of the curing agent. For example, the resin composition is prepared and treated at about 100 to 170° C. for 30 minutes to 2 minutes to form the reaction product.

According to this invention, the coating layer which does not have tack is formed through the aforementioned process even without drying. Accordingly, the present invention enables further formation of additional layers, such as a patterned layer, a deposition layer or an adhesive layer, on the coating layer or winding of the sheet for forming a hard coating without special equipment for forming a coating layer or a drying process. The thickness of the coating layer of the sheet for forming a hard coating is not particularly limited but may be properly adjusted to obtain desired physical properties.

As shown in FIGS. 1 and 2, the sheet 2 or 3 according to the embodiment of the invention includes the adhesive layer 21 or 31 formed on the coating layer 12 or on the base 11. When the sheet 2 or 3 is used as a transfer material or a surface protective layer, the adhesive layer 21 or 31 may provide adhesion to a molded product.

The adhesive layer 21 or 31 may be formed of various heat-sensitive or pressure-sensitive resins known in the art. For example, the adhesive layer 21 or 31 may include a suitable material selected from among polyacrylic resins, polystyrene resins, polyamide resins, chlorinated polyolefin resins, chlorinated ethylene-vinyl acetate copolymer resins, and rubber resins in consideration of the material quality of an adherend to which the adhesive layer 21 or 31 is attached.

Referring to FIG. 3 or 4, each of sheets 4, 5 for forming a hard coating according to exemplary embodiments may include a patterned layer 41 or 51 formed on a coating layer 12 or a base 11, and an adhesive layer 21 or 31 formed on the patterned layer 41 or 51. The patterned layer 41 or 51 may be formed by any method. For example, the patterned layer may be formed using a binder of a polyvinyl resin, a polyamide resin, a polyester resin, a polyacrylic resin, a polyurethane resin, a polyvinyl acetal resin, a polyester urethane resin, a cellulose ester resin, or an alkyd resin and coloring ink including pigments or dyes having a suitable color. The formation method and thickness of the patterned layer is not limited to a specific method and thickness and the patterned layer may be formed using any method known in the art.

Referring to FIG. 5 or 6, each of sheets 6, 7 for forming a hard coating according to other exemplary embodiments may further include a deposition layer 61 or 71 formed on a patterned layer 41 or 51. Although FIGS. 6 and 7 show that the patterned layer 41 or 51 is formed on a coating layer 12 or a base 11 and the deposition layer 61 or 71 is formed thereon, the deposition layer 61 or 71 may be formed directly on the coating layer 12 or the base 11 without the deposition layer 61 or 71, as needed. The deposition layer may be formed using any material and method used in the art, for example by vacuum deposition, sputtering, and the like.

The sheets for forming a hard coating according to the exemplary embodiments of the invention may include at least one anchor layer installed in a suitable place between the layers described above. The anchor layer may serve to enhance adhesion between the layers of the sheets and to protect a molded product or a patterned layer from chemicals. The anchor layer may be formed, for example, of a two-component urethane resin, melamine or epoxy thermosetting resins, or a thermoplastic resin including a vinyl chloride copolymer resin by a typical method.

A further aspect of the present invention provides a method of forming a hard coating on a surface of a molded product using the sheet for forming a hard coating according to the present invention. The method of forming a hard coating may include transferring or attaching the coating layer of the sheet to a molded product, and photocuring the coating layer to form a hard coating.

As used herein, the operation of "transferring the coating layer" means a process of forming the coating layer, which may be applied to a sheet realized by a transfer material (for example, see FIGS. 1, 3 and 5) and may include attaching a coating layer of the sheet or an adhesive layer of the sheet, if formed on the coating layer, to a molded product, and separating a base of the sheet from the molded product. Further, the operation of "attaching the coating layer" means a process of forming the coating layer, which may be applied to a sheet realized by a surface protective layer (for example, see FIGS. 2, 4 and 6) and may include attaching a base of the sheet or an adhesive layer of the sheet, if formed on the base of the sheet, to a molded product.

As such, the method of forming a hard coating according to the invention may include various operations depending on a type of sheet for forming a hard coating.

For example, when the sheet is used as a transfer material, the method may include bonding a coating layer of the sheet (or an adhesive layer formed on the coating layer) to the surface of a molded product; separating a base; and photocuring the coating layer through light irradiation.

According to the present invention, in use of the sheet as the transfer material, a hard coating may be formed on the surface of a molded product concurrently with manufacture of the molded product though injection molding. In this case, the method may include disposing the sheet in a mold, with the coating layer (or the adhesive layer, if formed on the coating layer) disposed to contact the molded product; injecting a molten resin into a cavity of the mold; separating the base from the sheet; and photo-curing the coating layer through light irradiation.

Further, when the sheet is used as a surface protective film, the method may include disposing the sheet, with a base (or an adhesive layer if formed on the base) facing the surface of a molded product; heating the sheet to soften the base; vacuum-suctioning the sheet from a lower side thereof to adhere the same to the surface of the molded product; and photo-curing the coating layer through light irradiation.

Further, according to the present invention, in use of the sheet as the surface protective film, a hard coating may be formed on the surface of a molded product concurrently with manufacture of the molded product though injection molding. In this case, the method may include disposing the sheet in a mold, with the coating layer (or the adhesive layer, if formed on the coating layer) disposed to contact the molded product; injecting a molten resin into a cavity of the mold; separating the base from the sheet; and photo-curing the coating layer through light irradiation.

In each method according to the present invention, the respective operations are not limited to a particular order. Rather, the respective operations may be performed in different orders or may be performed concurrently. For example, separating the base may be performed prior to photo-curing through light irradiation. Alternatively, when the base is formed of a light-transmitting material, separating the base may be performed after curing the coating layer. Alternatively, in the methods according to the present invention, heating, softening and vacuum suctioning may be performed at the same time.

Hereinafter, a transfer method according to the present invention will be described in detail with reference to the accompanying drawing.

FIG. 7 is a diagram of a transfer method according to an exemplary embodiment of the present invention.

In the method according to this embodiment, a sheet for forming a hard coating is disposed on a molded product 81, with a coating layer 12 (or an adhesive layer, not shown, if formed on the coating layer 12) placed at the bottom. Then, heat and/or pressure is applied to a base 11 of the sheet at about 80 to 260° C. and about 50 to 200 kg/m² using a roll transcriber or an up-down transcriber including a heat-resistant rubber elastic member 82, for example, silicon rubber, via the heat-resistant rubber elastic member 82. Accordingly, the coating layer 12 or the adhesive layer is bonded to the surface of the molded product 81. Subsequently, the sheet is suitably cooled as needed, and then the base 11 is separated from the coating layer 12. Then, the coating layer 12 transferred to the molded product 81 is photo-cured through light irradiation. As described above, the photo-curing process may be performed before separation of the base 11.

Conditions of photo irradiation are not particularly limited and may be suitably controlled in consideration of the composition of the coating layer. According to this invention, for example, photo irradiation may be performed via UV irradiation using a high pressure mercury lamp, an induction lamp, or a xenon lamp. In this case, the photo irradiation may be performed for 1 second to 5 minutes using UV light of wavelengths of about 300 to 400 nm at an illuminance of 80 to 200 mW/cm² and a light intensity of 1,000 to 2,000 mJ/cm².

Further, the molded product is not limited to a particular material. For example, the molded product may include resin products, wooden products, metal products, complex products thereof, or any type of molded products requiring a hard coating. Here, the resin products may include general resins, such as polystyrene resins, polyolefin resins, ABS resins, AS resins, or AN resins. In addition, general engineering resins, such as polyphenylene oxide/polystyrene resins, polycarbonate resins, polyacetal resins, acrylic resins, polycarbonate modified polyphenylene ether resins, polyethylene terephthalate resins, polybutylene terephthalate resins, and ultra-high-molecular weight polyethylene resins; and super engineering resins, such as polysulfone resins, polyphenyl sulfide resins, polyphenylene oxide resins, polyacrylate resins, polyether imide resins, polyimide resins, liquid crystal polyester resins, and heat-resistant polyaryl resins, may be used. Furthermore, complex resins containing a reinforcing material, such as glass fiber or inorganic fillers, may be used.

FIG. 8 is a diagram of a transfer method according to another exemplary embodiment, in which molding and transfer are concurrently performed by injection molding to transfer a coating layer to the surface of a molded product.

In this method, a sheet for forming a hard coating is disposed in an injection mold including a movable mold 91 and a fixed mold 92 such that a coating layer 12 (or an adhesive layer, not shown, if formed on the coating layer) is disposed inward and a base 11 is placed in contact with the fixed mold 92. Then, with the mold sealed, a molten resin 93 is injected into the mold through a gate formed in the movable mold 91 to form a molded product while attaching the coating layer to the surface of the molded product. Then, after the resin molded product is cooled under suitable conditions as needed, the mold is opened and the resin molded product is taken out. Before or after separating the base 11, the coating layer is cured by light irradiation to form a hard coating.

The kind of resin for the molded product and the conditions of photo irradiation are not particularly limited and may be suitably selected, for example, in the same manner as in the method illustrated in FIG. 8.

FIG. 9 is a diagram of a method of forming a hard coating effectively employed when a sheet for forming a hard coating is used as a surface protective sheet. In this method, the sheet for forming a hard coating is disposed on the surface of a molded product 101 such that a base 11 (or an adhesive layer, not shown, if formed on the base 11) is placed at the bottom. Then, the sheet is heated using a heater 103 to soften the base 11 and subjected at a lower side thereof to vacuum-suction 102 to adhere the base to the molded product 101. The coating layer is then photo-cured through light irradiation, thereby forming a hard coating. In this method, heating and vacuum-suctioning of the sheet may be performed at the same time, and pressing is performed from an upper side of the sheet simultaneously with vacuum-suctioning at the lower side thereof to improve adhesion efficiency. In this case, pressing the sheet for forming a hard coating may be performed directly using a fluid or using a plastic sheet.

In this method, the kind of resin for the molded product and the conditions of photo irradiation are not particularly limited and may be suitably selected, for example, in the same manner as in the method illustrated in FIG. 8.

FIG. 10 is a diagram of another method of forming a hard coating when a sheet for forming a hard coating is used as a surface protective sheet, in which injection molding and forming the hard coating are concurrently performed. According to this method, the sheet for forming a hard coating is disposed in a mold including a movable mold 112 and a fixed mold 111 such that a coating layer 12 is placed in contact with the fixed mold 111. Then, with the mold sealed, a molten resin 113 is injected into the mold through a gate in the movable mold 112 to form a molded product and to attach a base of the sheet or an adhesive layer formed on the base to the surface of the molded product at the same time. Then, as needed, after the molded product is cooled, the mold is opened to take out the molded product therefrom, and the coating layer is cured by light irradiation to form a hard coating.

In this method, the kind of resin for the molded product and the conditions of photo irradiation are not particularly limited and may be suitably selected, for example, in the same manner as in the method illustrated in FIG. 8.

In addition to the above methods, a hard coating may be formed by various methods known in the art.

Advantageous Effects

The present invention provide a transfer material or a surface protection sheet having a high index of refraction and superior physical properties, such as hardness, friction resistance, abrasion resistance, chemical resistance, transparency, luster, and the like, for forming a hard coating on the surface of various molded products, including resin molded products or wood products, and a method of forming a hard coating using such transfer material or surface protection sheets.

BEST MODE

Figure 1:
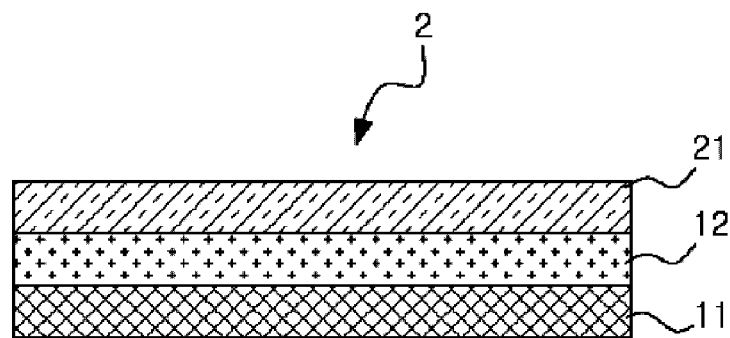
FIGS. 1 to 6 are sectional views of sheets for forming a hard coating according to various embodiments of the present invention.
Figure 2:
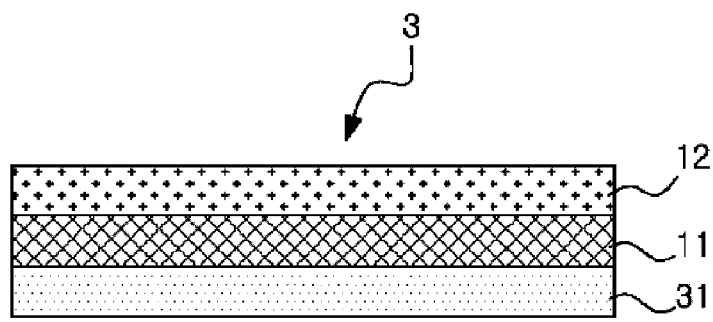
Figure 3:
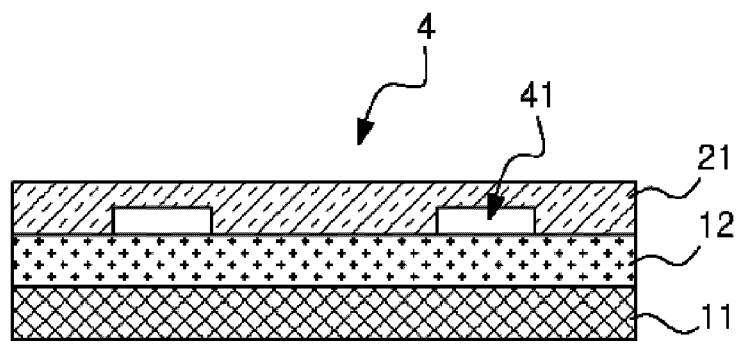
Figure 4:
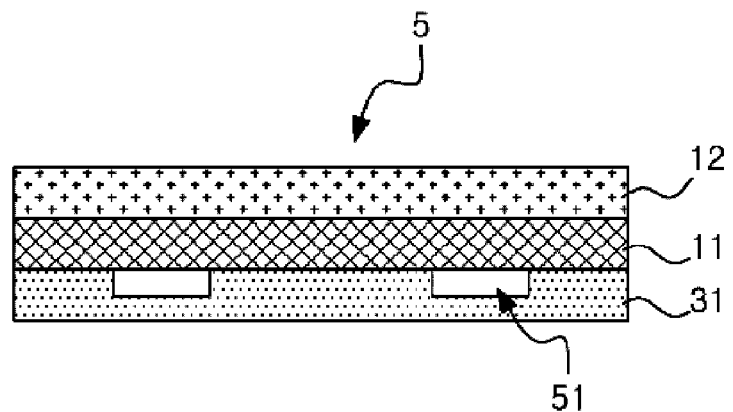
Figure 5:
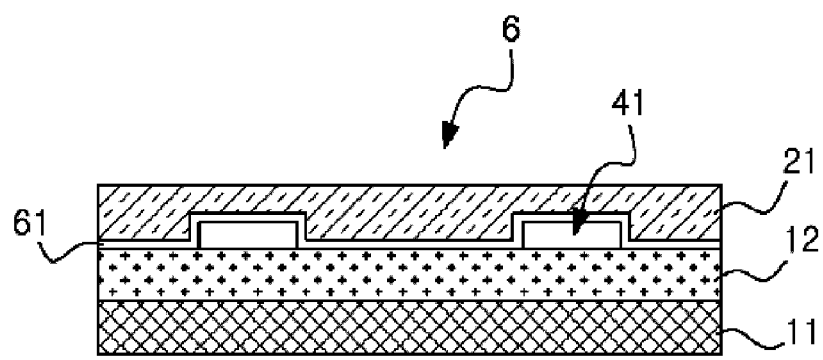
Figure 6:
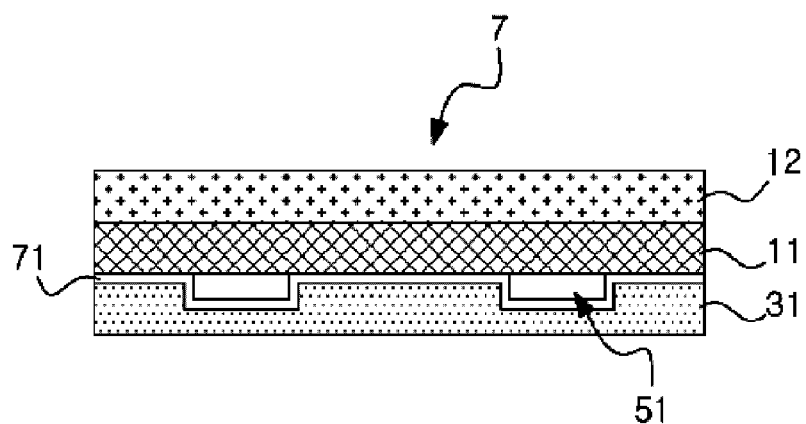
Figure 7:
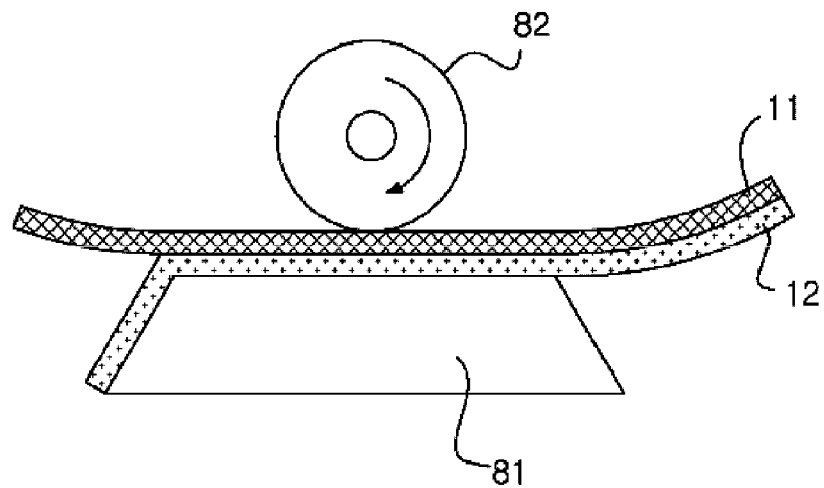
FIGS. 7 to 10 are diagrams of methods of forming a hard coating according to various embodiments of the present invention.
Figure 8:
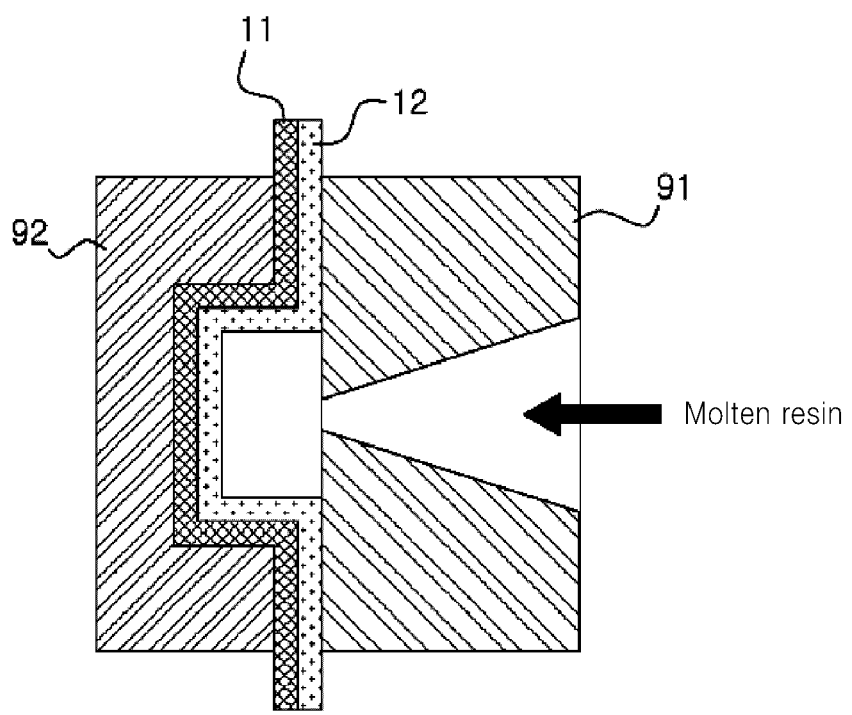

Next, the present invention will be explained in more detail with reference to examples and comparative examples. These examples are provided for illustrative purposes only and are not to be in any way construed as limiting the invention.

EXAMPLE 1

Preparation of Resin Containing Epoxy Group and (meth) acryloyl Group 11 parts by weight of glycidyl methacrylate (GMA), 3 parts by weight of methyl (meth)acrylate (MMA), 6 parts by weight of styrene (SM), 150 parts by weight of butyl acetate (BA), and 0.25 parts by weight of 2,2'-azobisisobutyronitrile (AIBN) were added to a reactor having a stirring device, a cooling pipe, a dropping lot, and a nitrogen introduction pipe. The reactor was heated to about 65° C. over about 1 hour under a nitrogen atmosphere and kept warm for about 9 hours. Then, a mixture including 43 parts by weight of GMA, 12 parts by weight of MMA, 25 parts by weight of SM, 0.5 parts by weight of lauryl mercaptan, and 1 part by weight of AIBN was dripped into the reactor over about 2 hours under a nitrogen atmosphere using the dropping lot, and the reactor was held at the same temperature for about 3 hours. Then, 0.25 parts by weight of AIBS was added to the reactor, which was kept warm for 2 hours. Subsequently, the temperature was adjusted to about 105° C. and the nitrogen introduction pipe was replaced by an air introduction pipe, after which 37 parts by weight of acrylic acid (AA), 0.05 parts by weight of p-methoxyphenol, and 0.04 parts by weight of dimethylaminopyridine (DMAP) were added to and mixed with the product, followed by staying at 105° C. under air bubbling. The mixture was left at the same temperature for 15 hours, 0.05 parts by weight of p-methoxyphenol was added thereto and cooled, and then methyl ethyl ketone was added thereto such that the content of nonvolatile components was 30%, thereby preparing a resin having an epoxy group and an acryloyl group. As a result of chemical analysis through titration, the prepared resin had an epoxy equivalent weight of 6,600 g/eq, an acryloyl equivalent weight of 349 g/eq., and a weight average molecular weight of 60,000 based on a polystyrene standard, as measured by GPC.

Preparation of Coating Solution 5 parts by weight of ethoxylated trimethylolpropane tris(3-mercaptopropionate) as a thiol curing agent, 20 parts by weight of dipentaerythritol hexaacrylate (DPHA), 5 parts by weight of a 1,6-hexane isocyanate trimer, 8 parts by weight of a photoinitiator, 1 part by weight of an antioxidant, 20 parts by weight of nanosilica, and 70 parts by weight of methyl ethyl ketone were mixed with 100 parts by weight of the resin, thereby preparing a coating solution.

Preparation of Sheet for Forming Hard Coating

A melamine release agent was applied to a thickness of about 1 μm to one side of a polyethylene terephthalate (PET) film having a thickness of 38 μm as a base using gravure coating, thereby forming a release layer. The prepared coating solution was applied to a thickness of about 6 μm to the release layer using micro-gravure coating. Then, the applied coating solution was heated at 150° C. for 30 seconds to cause reaction of epoxy groups of the resin and thiol groups of the thiol curing agent, thereby forming a heat-cured product. Then, an anchor layer (acrylic anchor layer), a patterned layer (acryl-urethane ink), a vacuum-deposition layer (acrylic resin deposited primer), and an adhesive layer (acrylic adhesive) were sequentially formed on the coating layer including the heat-cured product using micro-gravure printing, thereby manufacturing a sheet for forming a hard coating.

Formation of Hard Coating

Figure 9:
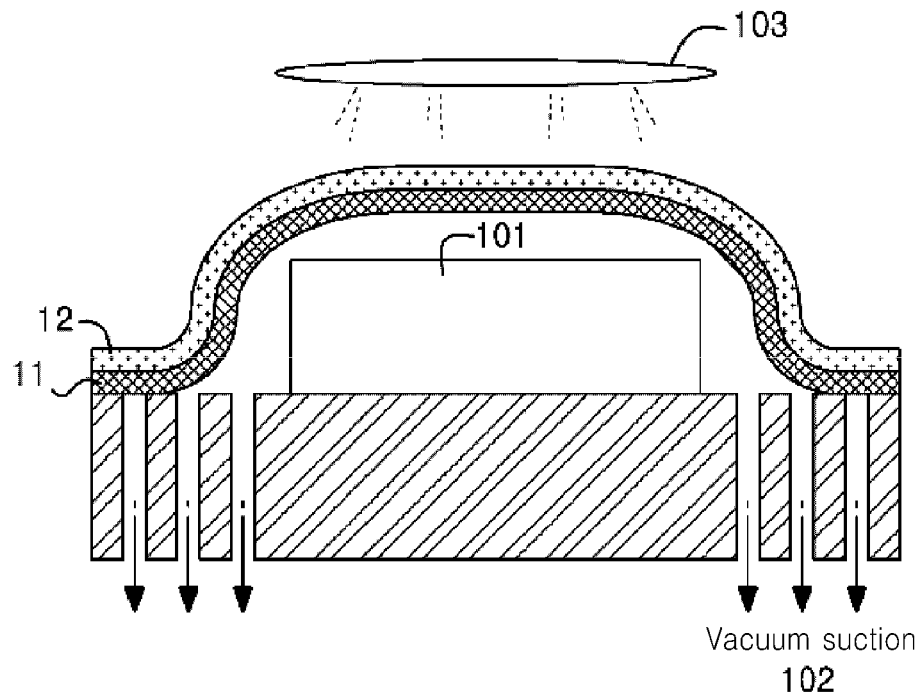
Figure 10:
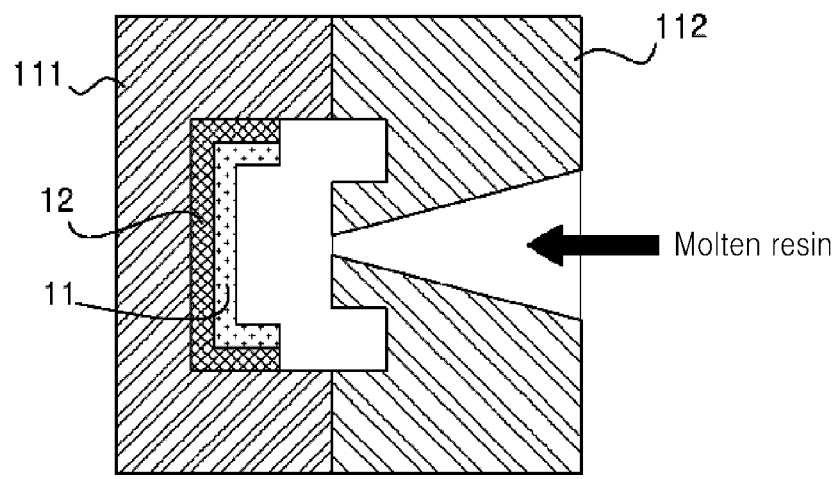

A hard coating was formed on the surface of a molded product by applying the prepared sheet to the method illustrated in FIG. 9. In detail, the sheet was disposed such that the base was placed in contact with the fixed mold 92, followed by injection of a molten resin, separation of the base, and UV irradiation, thereby forming the hard coating. Here, molding was carried out under the following conditions: the temperature of the resin was about 280° C., the temperature of the mold was about 60° C., and the pressure of the resin was about 1,600 kg/cm². Further, UV was irradiated at 1,000 w/cm for about 3 seconds with a lamp from a height of about 10 cm.

EXAMPLE 2

A composition and sheet for forming a hard coating were prepared in the same manner as in Example 1 except that ethylene glycol bis(3-mercaptopropionate) was used as a thiol curing agent instead of ethoxylated trimethylolpropane tris(3-mercaptopropionate), and a hard coating was formed on the surface of a molded product using the sheet.

EXAMPLE 3

A composition and sheet for forming a hard coating were prepared in the same manner as in Example 1 except that trimethylolpropane tris(3-mercaptopropionate) was used as a thiol curing agent instead of ethoxylated trimethylolpropane tris(3-mercaptopropionate), and a hard coating was formed on the surface of a molded product using the sheet.

EXAMPLE 4

A composition and sheet for forming a hard coating were prepared in the same manner as in Example 1 except that pentaerythritol tetrakis(3-mercapto-propionate) was used as a thiol curing agent instead of ethoxylated trimethylolpropane tris(3-mercaptopropionate), and a hard coating was formed on the surface of a molded product using the sheet.

EXAMPLE 5

A composition and sheet for forming a hard coating was prepared in the same manner as in Example 1 except that pentaerythritol tetrakis(3-mercaptoacetate) was used as a thiol curing agent instead of ethoxylated trimethylolpropane tris(3-mercaptopropionate), and a hard coating was formed on the surface of a molded product using the sheet.

COMPARATIVE EXAMPLE

A composition and sheet for forming a hard coating were prepared in the same manner as in Example 1 except that diisocyanate was used as a urethane curing agent instead of the thiol curing agent, and a hard coating was formed on the surface of a molded product using the sheet.

The compositions for coating prepared in Examples and Comparative Example were evaluated as to physical properties (pencil hardness), and results are shown in Table 1.

1. Pencil Hardness

Each of the compositions prepared in Examples 1 to 5 and the Comparative Example was applied to a thickness of 6 μm to a 2 mm-thick poly(methyl methacrylate) (PMMA) base using bar coating. Subsequently, the product was heat-cured at 160° C. for 40 seconds and then cured by UV irradiation (1,000 mW). Then, the pencil hardness of each product was evaluated at a load of 1 kg using a pencil hardness tester (Coretech Co., Ltd.) and a Mitsubishi pencil for measuring hardness.

TABLE 1

| | Example 1 | Example 2 | Example 3 | Example 4 | Example 5 | Comparative Example |
|---|---|---|---|---|---|---|
| Pencil hardness (H) | 5 | 5 | 5.5 | 6 | 5.8 | 4 |

As shown in Table 1, when the compositions for forming a hard coating according to the present invention are used, a hard coating having an effectively high hardness is formed.

The invention claimed is:

1. A sheet for forming a hard coating, comprising:
a base;
a release layer formed on one side of the base;
a coating layer formed on the release layer and containing a heat-cured product of a resin composition comprising a resin and a thiol curing agent, the resin having an epoxy group and a (meth)acryloyl group;
a patterned layer, formed using a binder of a polyvinyl resin, a polyamide resin, a polyester resin, a polyacrylic resin, a polyurethane resin, a polyvinyl acetal resin, a polyester urethane resin, a cellulose ester resin, or an alkyd resin and coloring ink including pigments or dyes having a suitable color, on the coating layer or on the other side of the base; and
an adhesive layer formed on the patterned layer;
wherein the resin composition further comprises a multifunctional acrylate present in an amount of 30 parts by weight or less based on 100 parts by weight of the resin,
wherein the resin has an epoxy equivalent weight of 4,000 g/eq to 6,600 g/eq and a (meth)acryloyl equivalent weight of 349 g/eq to 500 g/eq;
wherein the thiol curing agent has at least two thiol groups and is present in an amount of 0.5 to 5 parts by weight based on 100 parts by weight of the resin; and
wherein the sheet has a pencil hardness of 5H or more.

2. The sheet of claim 1, wherein the resin has a weight average molecular weight of about 5,000 to 100,000.

3. The sheet of claim 1, wherein the thiol curing agent is represented by Formula 1:

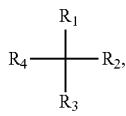

where $R_1$ to $R_4$ each independently represent hydrogen, alkyl, alkoxy, alkenyl, alkynyl, or a thiol containing group.

4. The sheet of claim 3, wherein the thiol containing group is represented by Formula 2:

-A-B—C-D-SH where A represents a single bond or alkylene, B represents —NH(C=O)—, —OC(=O), —O—E—OC(=O)—, —SC(=O)—, or —OCH$_2$—, C represents a single bond or alkylene, and D represents a single bond or a bivalent moiety represented by Formula 3, wherein E represents alkylene:

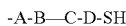 [formula 3]

where P represents bivalent aryl, and n represents an integer from 0 to 10.

5. The sheet of claim 3, wherein $R_1$ to $R_4$ each independently represent hydrogen, C1 to C4 alkyl or -A-B—C-D-SH, and at least two of $R_1$ to $R_4$ comprise -A-B—C-D-SH, where A represents a single bond or C1 to C4 alkylene, B is —OC(=O) or —O-E-OC(=O)—, C represents a single bond or C1 to C4 alkylene, and D represents a single bond or a bivalent moiety represented by Formula 4, wherein E represents C1 to C4 alkylene:

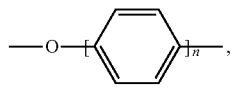 [Formula 4]

where n represents an integer from 0 to 10.

6. The sheet of claim 1, wherein the resin composition further comprises a photoinitiator.

7. The sheet of claim 6, wherein the photoinitiator is present in an amount of 1 to 15 parts by weight based on 100 parts by weight of the resin.

8. The sheet of claim 1, wherein the resin composition further comprises an antioxidant.

9. The sheet of claim 8, wherein the antioxidant is present in an amount of 0.1 to 2 parts by weight based on 100 parts by weight of the resin.

10. The sheet of claim 1, wherein the resin composition further comprises lubricants, UV absorbers, thermosetting catalysts, fillers, or isocyanate compounds.

11. The sheet of claim 1, further comprising: a deposition layer on the coating layer or on the other side of the base.

12. The sheet of claim 1, wherein the thiol curing agent includes at least one polythiol selected from the group consisting of: ethoxylated trimethylolpropane tris(3-mercaptopropionate), ethylene glycol bis(3-mercaptopropionate), trimethylolpropane tris(3-mercaptopropionate), pentaerythritol tetrakis (3-mercaptopropionate), and pentaerythritol tetrakis(3-mercapto acetate).

13. A sheet for forming a hard coating, comprising:
a base;
a release layer formed on one side of the base
a coating layer formed on the release layer and containing a heat-cured product of a resin composition comprising a resin and a thiol curing agent, the resin having an epoxy group, a (meth)acryloyl group, an epoxy equivalent weight of 4,000 g/eq to 6,600 g/eq, and a (meth)acryloyl equivalent weight of 349 g/eq to 500 g/eq;
a patterned layer, formed using a binder of a polyvinyl resin, a polyamide resin, a polyester resin, a polyacrylic resin, a polyurethane resin, a polyvinyl acetal resin, a polyester urethane resin, a cellulose ester resin, or an alkyd resin and coloring ink including pigments or dyes having a suitable color, on the coating layer or on the other side of the base; and
an adhesive layer formed on the patterned layer;
wherein the resin composition has a weight average molecular weight of 20,000 to 70,000 and further comprises a multifunctional acrylate present in an amount of 30 parts by weight or less based on 100 parts by weight of the resin, wherein the thiol curing agent has at least two thiol groups and is present in an amount of 0.5 to 5 parts by weight based on 100 parts by weight of the resin; and wherein the sheet has a pencil hardness of 5H or more.

* * * * *